United States Patent [19]

Ko et al.

[11] 4,383,092
[45] May 10, 1983

[54] INHIBITION OF DISCOLORATION OF TRANSESTERIFICATION POLYMERS WITH CHROMIUM, NICKEL, TANTALUM OR GLASS LINED REACTOR

[75] Inventors: Allen W. Ko, Evansville, Ind.; John B. Starr, Jr., Pittsfield, Mass.

[73] Assignee: General Electric Company, Pittsfield, Mass.

[21] Appl. No.: 176,865

[22] Filed: Aug. 11, 1980

[51] Int. Cl.$^3$ .................. C08G 63/62; C08G 63/02; C08J 9/26; C08J 9/28
[52] U.S. Cl. .................................. 526/62; 528/176; 528/180; 528/181; 528/196; 528/200; 528/198
[58] Field of Search .................. 526/62; 528/200, 180, 528/181

[56] References Cited

U.S. PATENT DOCUMENTS

| | | | |
|---|---|---|---|
| 2,130,948 | 9/1939 | Carothers | 528/336 |
| 2,165,253 | 7/1939 | Graves | 526/62 |
| 2,338,443 | 1/1944 | Kroeper et al. | 526/62 |
| 2,902,469 | 9/1959 | Burkhard | 528/181 |
| 3,083,182 | 3/1963 | Matsukane et al. | 528/200 |
| 3,299,172 | 1/1967 | Schade et al. | 528/198 |
| 3,395,119 | 7/1968 | Blaschke et al. | 528/198 |
| 3,697,479 | 10/1972 | Maycock | 528/181 |

*Primary Examiner*—Harold D. Anderson
*Attorney, Agent, or Firm*—Hedman, Casella, Gibson, Costigan & Hoare

[57] ABSTRACT

A process for the production of a substantially clear and colorless, or at most slightly tinted, polyarylcarbonates useful to form molded structural and engineering articles suitable to replace metal parts, or for use in electrical appliances to form lenses, safety shields, instrument windows and the like is disclosed.

The tendency of color formation in polycarbonates and polyarylates prepared by transesterification and polycondensation is reduced or inhibited by carrying out the transesterification reaction while the reaction mixture contacts only metal surfaces of selective metals, or glass. The metal surfaces are provided by such metals as tantalum, nickel, or chromium or mixtures thereof. The reaction is carried out in reactors or systems which are substantially totally made of such metals, or reactors or systems clad or lined with a layer of such metals or glass. In its broad aspects the invention comprises carrying out the reaction in the substantial absence of metals selected from the group consisting of iron, tin, lead, titanium, vanadium, zirconium, stainless steel, and Group IIIA metals, namely, aluminum, gallium, indium and thallium. The preferred method of carrying out the reaction is in the absence of metals other than nickel, tantalum and chromium or mixtures thereof.

17 Claims, No Drawings

INHIBITION OF DISCOLORATION OF TRANSESTERIFICATION POLYMERS WITH CHROMIUM, NICKEL, TANTALUM OR GLASS LINED REACTOR

BACKGROUND OF THE INVENTION

It is known that aromatic polyaryl esters or polyarylates may be prepared by transesterification and polycondensation of mixtures of diaryl esters of aromatic carboxylic acids, also together with diaryl carbonates, if desired, and dihydric phenols, and that polycarbonates may be prepared by tranesterification of a diaryl carbonate with a dihydric phenol. It this application, polyarylates are considered to be polycarbonates in which all or part of the carbonic acid residues are replaced by aryl dicarboxylic acid residues, preferably isophthalic and/or terephthalic acid residues.

A disadvantage of known transesterification processes is the tendency of undesirable color or discoloration to form in the resulting polymers. Thus in U.S. Pat. No. 3,299,172, granted Jan. 17, 1967, it is stated (Col. 1, lines 39–43): "Any excess of hydroxyl compounds causes a brown to black discoloration of the polycondensate, because of the insufficient thermal stability of the partial esters of the dihydric phenols still containing free hydroxyl groups which are being formed." The examples in the patent refer to polyesters having yellowish colors.

This problem is also referred to in U.S. Pat. No. 3,395,119 to Blaschke et al at column 2, lines 28–31 where it is stated: "Moreover, excess bisphenol A causes strong discoloration of the polyester because of the thermal instability thereof at the high condensation temperatures employed." The examples in the Blaschke et al patent refer to brownish and yellowish colors of the polyesters which are obtained.

SUMMARY OF THE INVENTION

The discovery has now been made that undesired color formation, that is the discoloration of the polymers produced in the transesterification process, can be reduced or inhibited when the reaction is carried out in the presence of selective metals or glass, so that the reaction mixture contacts only surfaces of such metals or of glass. The metals are tantalum, nickel or chromium.

The reaction is carried out in reactors or systems substantially totally made of such metals to provide the contact surface or in reactors or systems clad or lined with a layer of such metals or glass to provide the contact surface.

The preferred embodiment of the invention is in carrying out the reaction in reactors or systems substantially totally made of tantalum, nickel or chromium metals or mixtures thereof to provide the contact surface or reactors or systems clad or lined with such metals or glass. However, glass, all-glass reactors or systems do not withstand the operating conditions required for the transesterification reaction. Accordingly, it is required to employ reactors clad or lined with glass in such a manner as will withstand the conditions of the reaction.

When the reaction is carried out in accordance with the subject process, a clear product is obtained. On the other hand, when stainless steel reactors are employed a dark brown prepolymer is obtained. When titanium, vanadium, iron, tin, lead, zirconium, stainless steel and Group IIIA metals, such as aluminum in particulate form are employed, marked discoloration of the prepolymer occurs.

Accordingly, in its broad aspects the subject invention comprises carrying out the reaction in the absence of metals selected from the group consisting of iron, tin, lead, titanium, vanadium, zirconium, stainless steel, and Group IIIA metals, namely, aluminum, gallium, indium, and thallium. The preferred method of carrying out the invention is in the absence of surfaces with which the reaction mixture comes in contact other than surfaces made of substantially only tantalum, nickel or chromium and mixtures thereof; or a reaction vessel or system clad or lined with a layer of such metal, or with a layer of glass so that the glass withstands the reaction conditions. In such case substantially clear or at most slightly tinted polymers are obtained.

DETAILED DESCRIPTION OF THE INVENTION

The subject invention comprises the process of preparing polyarylates and polyarylcarbonates by transesterification and polycondensation of:

(1) mixtures of one or more diaryl esters of aromatic carboxylic acids with dihydric phenols;

(2) mixtures of (1) with diarylcarbonates; or (3) mixtures of diarylcarbonates with a dihydric phenol, wherein the transesterification reaction is carried out with either of the reaction mixtures (1), (2) or (3) being in contact substantially only with a metal surface of tantalum, nickel, or chromium in order to reduce or inhibit discoloration of the resulting polymer. The metal surface is provided by the reaction vessel which is totally made of any of the aforesaid metals or other mixture or by a reaction vessel clad or lined by said metals, or by glass.

As examples of diaryl esters of aromatic carboxylic acids, are diaryl esters of terephthalic acid and/or isophthalic acid, such as the diphenyl, di-chlorophenyl, and di-nitrophenyl esters or mixtures thereof.

As examples of dihydric phenols particularly useful in the process is bisphenol A (bis(4-hydroxyphenyl)-2,2-propane). Other examples are resorcinol and hydroquinone.

As examples of diarylcarbonates are diphenyl carbonate and di-xylenyl carbonate.

As transesterification catalysts, we employ alkali metal salts and hydroxides, such as, for example lithium, potassium or sodium stearates, or the hydroxides of these metals.

In general the process is carried out by charging any of the mixtures (1), (2) or (3) into a reaction vessel wholly made out of the aforesaid metals, or clad or lined with said metals or glass. The reactants are melted together at about 150° C. and the transesterification catalyst added. The transesterification reaction is carried out at a temperature ranging from about 135° C. to about 265° C. and pressures from atmospheric down to about 15 torr until about 60% of the theoretical amount of phenol is collected. The polycondensation may be continued to any desired built up stage to a higher polymer.

The polymers obtained may be molded in any desired shape and are useful as structural and engineering materials to replace metal parts, in electrical appliances, as lenses, safety shields, instrument windows, and used in many other ways known for such polymers.

The invention is further described in the examples which follow. These examples, other than those which are comparative, are preferred embodiments of the invention, and are not to be construed in limitation thereof.

EXAMPLE 1

A stainless steel reaction vessel electrically plated with nickel to provide a nickel surface is charged with 150 g. (0.700 mole) diphenyl-carbonate and 150 g. (0.658 mole) of bisphenol A. The mixture is melted together at 120° C. and heated from 120° C. to 250°–260° C. in one hour under nitrogen. Phenol formed by the reaction begins to reflux and is distilled ff with the aid of a nitrogen purge. When phenol distillation slows the pressure is reduced to about 10 mmHg until about 75% of the theoretical amount of phenol is distilled off. The brittle glassy polymer has an intrinsic viscosity of 0.12 dl/g (30° C. in $CHCl_3$) and a good color.

EXAMPLE 2

When the process of Example 1 is repeated except that a stainless steel reactor is used to provide a steel surface in place of the nickel surface in contact with the reaction, mixture, the product has obtained an intrinsic viscosity of 0.11 gl/g (30° C. in $CHCl_3$) but a dark brown color.

EXAMPLE 3

125 g. (0.584 mole) diphenylcarbonate, 124 g. (0.544 mole) bisphenol A and 0.005 g. (0.00013 mole) LiCl are charged into a glass lined reaction vessel. The mixture is homogenized at 140° C. and 9 g. of stainless steel powder are added and a nitrogen purge is established. The reaction is heated to 230°–240° C. in one hour and phenol distillation commences. Heating of the reaction mixture at temperatures up to 265° is continued until 65–70% of the theoretical amount of phenol is distilled off (about 45 min.). The reaction mixture is decanted from the metal powder and forms a dark brown solid when cooled to room temperature. The prepolymer may be advanced to any desired stage or polymerization by subjecting it further to elevated temperatures and reduced pressure. The stainless steel powder promotes discoloration of the polymer.

EXAMPLE 4

The process of Example 3 is repeated except that 8.5 g. of stainless steel powder which was reclaimed from a previous reaction is used. The color of the product was dark orange. The prepolymer may be advanced to any desired stage of polymerization by subjecting it further to elevated temperatures and reduced pressure.

EXAMPLE 5

100 g. (0.467 mole) diphenylcarbonate and 100 g. (0.438 mole) bisphenol A and 0.005 g. (0.00013 mole) LiCl are charged into a reaction vessel and homogenized at 150° C. Ten grams nickel powder are added to the mixture, a nitrogen purge is established, and the reaction is heated to 255°–265° C. Heating of the reaction mixture is continued until 65–70% of the theoretical amount of phenol is distilled off. The reaction mixture is decanted from the metal powder. The product has fair color. The prepolymer may be advanced to any desired stage of polymerization as described in Example 4. The nickel powder retards discoloration.

EXAMPLE 6

The process of Example 5 is repeated except that 10 g. of nickel powder reclaimed from the experiment of Example 5 is added. The prepolymer had a very light bronze tint. The prepolymer may be advanced to any desired stage of polymerization as described in Example 4.

EXAMPLE 7

The entire procedure of Example 5 is repeated except that 10 g. tantalum powder is used. The color of the prepolymer was fair. The prepolymer may be advanced to any desired stage of polymerization as described in Example 4.

EXAMPLE 8

The entire procedure of Example 5 is repeated except that 10 g. tantalum powder reclaimed from the experiment of Example 7 is used. The prepolymer had a very faint straw colored tint. The prepolymer may be advanced to any desired stage of polymerization as described in Example 4.

EXAMPLE 9

The process of Example 5 is repeated except that no metal powder is added and a glass lined reaction vessel is used instead of the stainless steel vessel. The prepolymer obtained was nearly water white. The prepolymer may be advanced in the same manner as described in Example 4.

EXAMPLE 10

The process is carried out as in Example 9, except that a chromium clad reaction vessel is employed. The prepolymer was of good color, and may be advanced in the same manner as in Example 4.

EXAMPLE 11

The following mixture is introduced in a reaction vessel.

| | |
|---|---|
| 0.237 mole | (75.36g.) of diphenyl terephthalate |
| 0.158 mole | (50.20g.) of diphenyl isophthalate |
| 0.044 mole | ⎫ |
| 0.008 mole | ⎬ (11.1g.) of diphenyl carbonate |
| 0.439 mole | (100g.) of bis phenol A |

2 ml of lithium stearate solution (131 mg. of lithium stearate dissolved in 100 ml methyl alcohol) were added as catalyst. Ten grams of stainless steel turnings (which were seasoned by previously contacting them with the reagents of this example at temperatures and pressures of this example) were added. The transesterification reaction is carried out at temperatures of from 190° C. to 250°–260° C. under a nitrogen atmosphere for about 2 hours and then at reduced pressures of 200 mm down to about 10 mmHg until 80 to 90 percent conversion is effected. The metal turnings are removed. The resulting polymer had a dark brown, licorice color. The prepolymer may be advanced as described in Example 4.

EXAMPLE 12

The process of Example 11 is repeated except that 10 grams of nickel turnings (which were seasoned by contacting them with the reagents of this example at the temperatures and pressures of this example) were used in place of the stainless steel turnings. The resulting prepolymer had a light yellow color, and may be advanced as described in Example 4.

EXAMPLE 13

The process of Example 11 is repeated except that 10 grams of tantalum turnings (which were seasoned by previously contacting them with the reagents of this example at the temperatures and pressures of this example) were used in place of the stainless steel turnings. The resulting prepolymer had a light yellow color, and may be advanced as described in Example 4.

EXAMPLE 14

Aromatic polycarbonates can be prepared by a continuous process as follows: Into a glass liquid reaction vessel there is introduced 1 part of bisphenol A and 1-1.1 parts of diphenylcarbonate and 0.000026-0.000037 part of alkaline metal salts as a catalyst. The mixture is allowed to react at a temperature of 160°-200° C. at atmospheric pressure for 2-4 hours. The prepolymer reaction is completed in two subsequent nickel clad reactors with increasing temperature and vacuum. The temperature is increased to a final 240° C. and vacuum is increased to 7-20 mm Hg. The total residence time in the reactors is from 2-5 hours. The final polymerization is carried out in two stainless steel wiped film reactors with a final temperature of 260°-280° C. and a vacuum of 0.2-0.5 mmHg. A product having a 0.5-0.7 IV (intrinsic viscosity) and a Gardner Yellow Index of 3-4 is obtained. The product line connecting the reactors is made out of nickel pipes.

EXAMPLE 15

When the process is carried out as in Example 14, but the reactors are stainless steel reaction vessels and the product line is constructed out of stainless steel pipe, while a product is obtained have a similar IV as in Example 14, its Gardner Yellow Index is 22 instead of 3-4.

EXAMPLE 16

The following mixture is introduced in a reaction vessel:

| | |
|---|---|
| 0.237 mole (75.36 grams) of diphenyl terephthalate | |
| 0.158 mole (50.20 grams) of diphenyl isophthalate | |
| 0.044 mole | (11.1 grams) of diphenyl carbonate |
| 0.008 mole excess | |
| 0.439 mole (100 grams) of bisphenol A. | |

Then 2 ml. of lithium stearate solution (131 mg. of lithium stearate dissolved in 100 ml. methyl alcohol) were added as the catalyst, and 9 grams of nickel powder (mesh 100), were added.

The transesterification reaction is carried out at temperature of from 190° C. to 258° C. until conversion is effected. The metal powder was removed. The resulting prepolymer had a good color.

The foregoing detailed description will suggest many variations to those skilled in this art. All such variations are within the full scope of the appended claims.

We claim:

1. In a process for the preparation of a moldable polyarylate or polyaryl carbonate by transesterification and polycondensation of
   (1) a mixture of at least one diaryl ester of an aromatic carboxylic acid and at least one dihydric phenol, or
   (2) a mixture of (1) with at least one diaryl carbonate,
   the improvement which comprises reducing discoloration of the resulting polymer by carrying out the transesterification in a reaction vessel having a contact surface composed of tantalum, nickel, or chromium, or mixtures of any of the foregoing.

2. A process according to claim 1, where the dihydric phenol is bisphenol A.

3. A process according to claim 1, wherein the diaryl ester of the aromatic carboxylic acid is selected from the group consisting of diaryl terephthalate, diaryl isophthalate and mixtures thereof.

4. A process according to claim 3, wherein the diarylterephthalate is diphenyl terephthalate.

5. A process according to claim 3, wherein the diaryl isoterephthalate is diphenyl isoterephthalate.

6. A process according to claim 1, wherein the contact surface is of tantalum.

7. A process according to claim 1, wherein the contact surface is of nickel.

8. A process according to claim 1, wherein the contact surface is of chromium.

9. In a process for the preparation of a moldable polyarylate or polyaryl carbonate by transesterification and polycondensation of
   (1) a mixture of at least one diaryl ester of an aromatic carboxylic acid and at least one dihydric phenol, or
   (2) a mixture of (1) with at least one diaryl carbonate,
   the improvement which comprises reducing discoloration of the resulting polymer by carrying out the transesterification reaction in a reactor or system substantially totally made of tantalum, nickel, chromium or mixtures thereof or clad or lined with a layer of the aforesaid metals so that the reaction mixture comes only in contact with the surface of said metals.

10. A process for the preparation of a moldable polyarylate or polyaryl carbonate by transesterification and polycondensation of
    (1) a mixture of at least one diaryl ester of an aromatic carboxylic acid and at least one dihydric phenol, or
    (2) a mixture of (1) with at least one diaryl carbonate,
    the improvement which comprises reducing discoloration of the resulting polymer by carrying out the transesterification with the reaction mixture in the substantial absence of metals selected from the group consisting of iron, tin, lead, titanium, vanadium, zirconium, stainless steel and Group IIIA metals of the Periodic System and selected from the group consisting of aluminum, gallium, indium and thallium.

11. A process according to claim 10 where the reaction is carried out in the absence of metals other than tantalum, nickel and chromium or mixtures thereof.

12. In a process for the preparation of a moldable polyarylate or polyaryl carbonate by transesterification and polycondensation of
    (1) a mixture of at least one diaryl ester of an aromatic carboxylic acid and at least one dihydric phenol, or
    (2) a mixture of (1) with at least one diaryl carbonate,
    the improvement which comprises reducing discoloration of the resulting polymer by carrying out the transesterification reaction in a reactor or system wherein the reactor or system is clad or lined with a layer of glass so that the reaction mixture comes only in contact with the surface of said glass layer.

13. A process for the prevention of undesired color formation in the course of preparing a moldable polyarylate or polyaryl carbonate polymer said process comprising:

(a) providing a reaction mixture of
   (i) at least one diaryl ester of an aromatic carboxylic acid and at least one dihydric phenol, or
   (ii) a mixture of (i) which at least an diaryl carbonate, in a reaction vessel having a contact surface of tantalum, nickel, chromium, or mixtures of any of the foregoing; and, thereafter, (b) transesterifying and polycondensing said reaction mixture until formation of the polyaryl carbonate is substantially complete.

14. A process according to claim 13 wherein the contact surface is of tantalum.

15. A process according to claim 13 wherein the contact surface is of nickel.

16. A process according to claim 13 wherein the contact surface is of chromium.

17. A substantially clear and colorless polyarylate or polyaryl carbonate prepared by the process in any one of claims 1-5 and 6-16.

* * * * *